Patented Nov. 25, 1924.

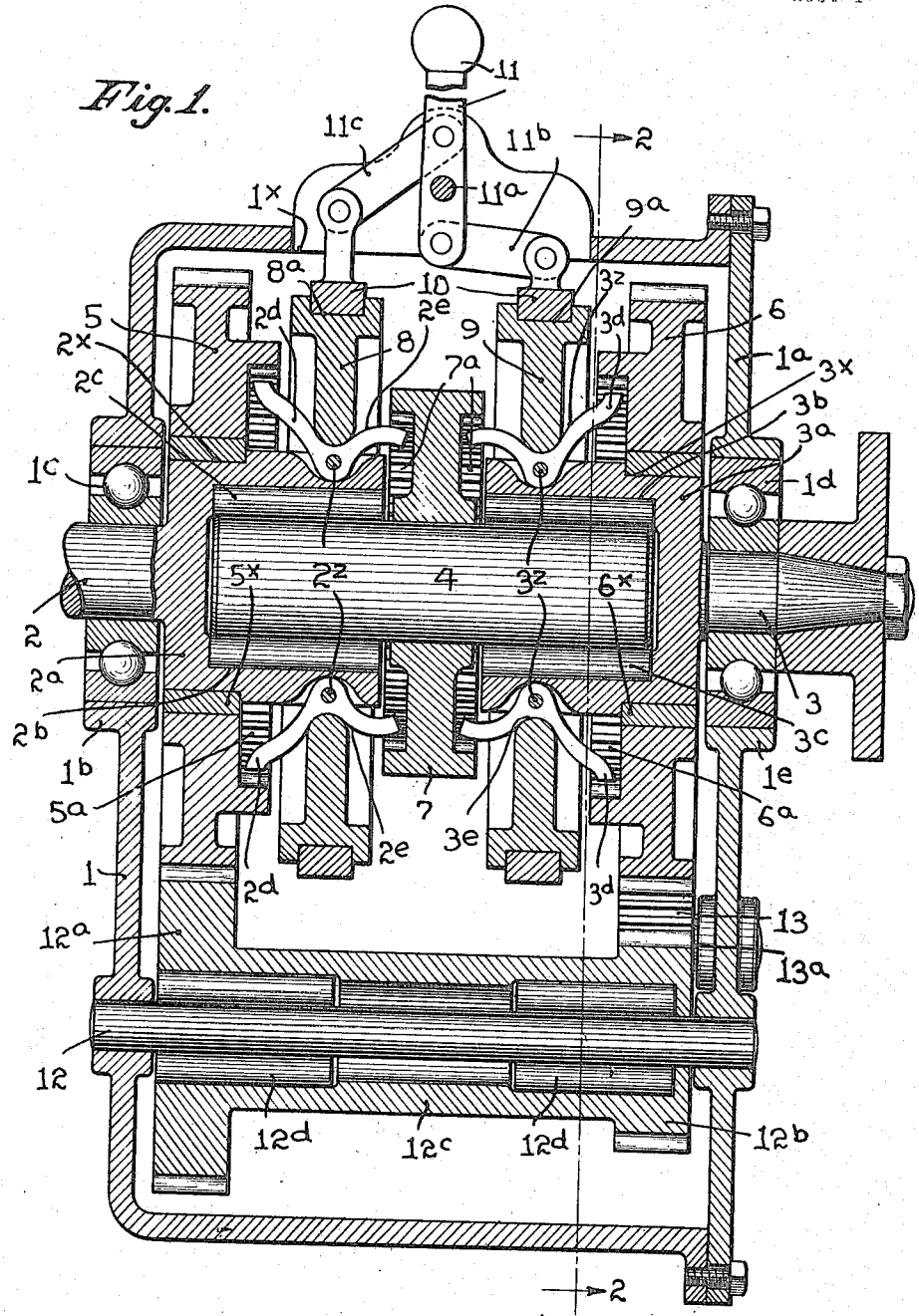

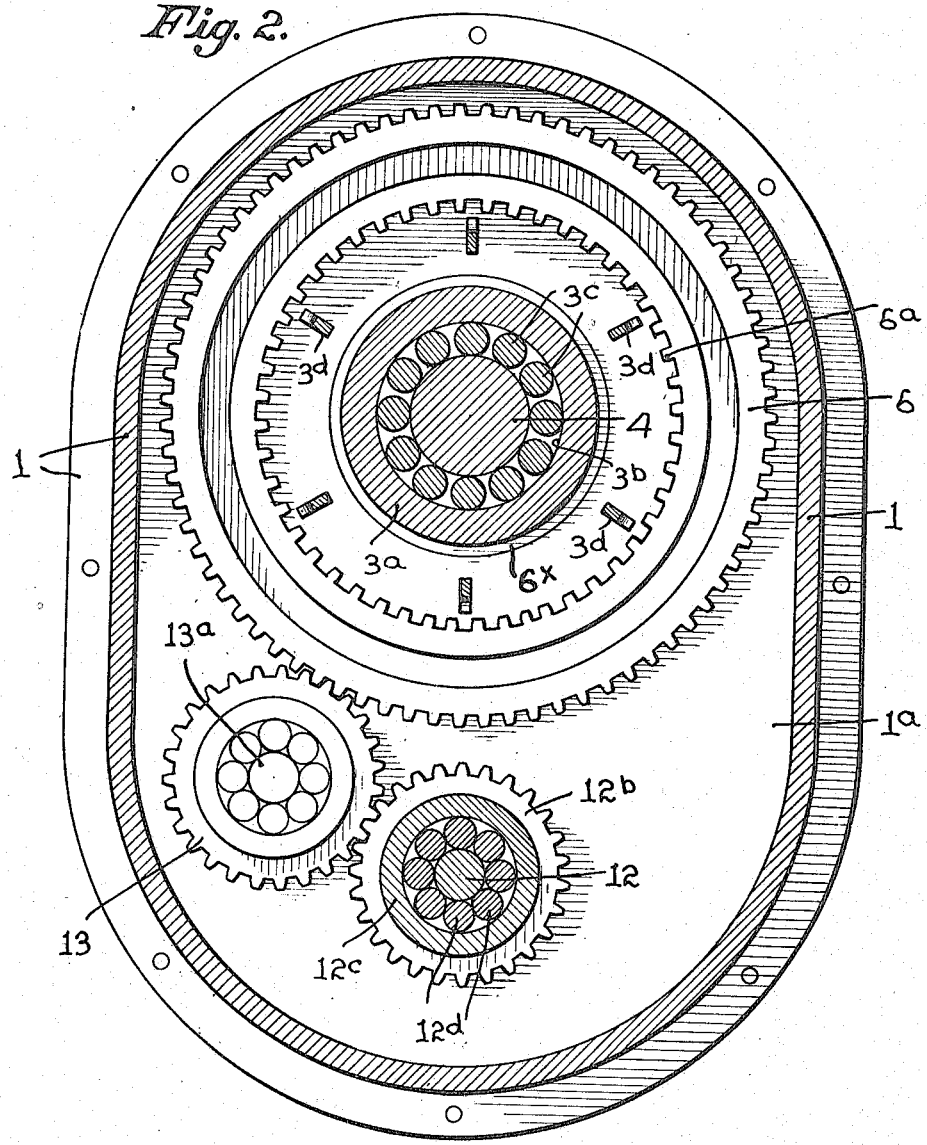

1,517,189

UNITED STATES PATENT OFFICE.

HENRY LOWE BROWNBACK, OF NORRISTOWN, PENNSYLVANIA.

REVERSING MECHANISM.

Application filed May 9, 1924. Serial No. 712,068.

*To all whom it may concern:*

Be it known that I, HENRY LOWE BROWNBACK, a citizen of the United States, residing at Norristown, in the county of Montgomery and State of Pennsylvania, have invented certain new and useful Improvements in Reversing Mechanism; and I hereby declare that the following is a full, clear, and exact description thereof, reference being had to the accompanying drawings, which form part of this specification.

This invention is an improvement in reversing mechanism and the principal objects thereof are to provide a novel, simple and efficient reversing mechanism adapted to be connected between a prime mover and driven shaft, or between two aligned shafts, to permit the prime mover and driven shaft, or the two shafts, to turn as a unit; also, to permit the prime mover or one shaft, to rotate while the driven shaft, or other shaft, remains idle, and vice versa; also, to permit the prime mover, or one shaft, to rotate in one direction while the driven shaft, or other shaft, is rotated thereby in the opposite direction; also, to permit the driven shaft, or one shaft, to be rotated a different speed from that of the prime mover or other shaft.

Heretofore the above objects have been usually accomplished by means of a clutch followed by a transmission consisting of gears sliding or rolling into mesh, or gears constantly locked in mesh but adapted to be unlocked from their shafts by means of sliding dog clutches, or by means of a clutch and planetary gear arrangement. In the sliding gear or dog clutch arrangement a counter shaft is usually provided, which counter shaft rotates at all times, and carries thereon an idler gear likewise rotating at all times, and great dexterity must be exercised in manipulating said gears into and out of mesh, which gears must first be brought to certain relative speeds before they may be readily meshed.

In my novel mechanism, the counter shaft rotates only when thrown into "reverse" or the "gear down" action is desired, and not when thrown for "direct" rotation, or in "neutral". Furthermore, no great dexterity is required in the operation of the mechanism.

I will explain the invention with reference to the accompanying drawings which illustrate one practical embodiment thereof, to enable others to adopt and use the same, and will summarize in the claims the novel features of construction, and novel combinations of parts, for which protection is desired.

In said drawings:

Figure 1 is a vertical longitudinal section through my novel reversing mechanism showing the parts in "neutral" position.

Fig. 2 is a vertical transverse section on the line 2—2, Fig. 1.

As shown in the drawings, my novel reversing mechanism preferably comprises a casing 1, of any desired shape, adapted to house the working parts of the mechanism. Casing 1 is preferably open at one end but is normally closed by means of a removable end plate $1^a$, which may be screwed or otherwise attached to the casing 1 in any desired manner, the said connection between casing 1 and end plate $1^a$ being preferably oil-tight.

In one end of casing 1 is provided a bearing $1^b$, adapted to house a ball bearing $1^c$ for the end of a driving or driven shaft 2, which shaft enters the casing as shown. In the opposite end of the casing 1 is a bearing $1^e$, adapted to house a ball-bearing $1^d$ for the end of a second driving or driven shaft 3, entering the casing and disposed in axial alignment with the shaft 2.

The inner end of shaft 2, within the casing 1, is provided with an enlarged cylindrical head $2^a$, which head is provided with an axial bore $2^b$ adapted to receive a roller bearing $2^c$ for an idler shaft 4 disposed in axial alignment with the shafts 2 and 3, as shown.

The inner end of shaft 3 is likewise provided with an enlarged cylindrical head $3^a$, which head is similarly provided with an axial bore $3^b$, adapted to receive a roller bearing $3^c$, which supports the opposite end of idler shaft 4.

By the above construction, idler shaft 4 is journaled in the enlarged ends of the shafts 2 and 3, and serves to maintain shafts 2 and 3 in axial alignment, while permitting either shaft 2 or 3 to rotate without imparting rotation to the other shaft.

Interposed between the adjacent ends of heads $2^a$ and $3^a$ is a member 7 mounted upon the idler shaft 4, said member 7 preferably comprising a wheel or gear, having annular internally serrated or toothed portions $7^a$ on its opposite faces, coaxial with the shafts 2, 3 and 4. Member 7 may be either loosely mounted on, or keyed to, the shaft 4.

Upon the head $2^a$ is a gear 5 which gear 5 is adapted to "float" upon said head $2^a$, and is freely mounted upon said head in any desired manner. As shown, head $2^a$ is provided with an annular recess or reduced portion $2^x$ and gear 5 is preferably mounted upon the portion $2^x$, with a bushing $5^x$ of any desired material interposed between said gear 5 and the portion $2^x$. On the inner face of gear 5 is an annular internally serrated or toothed collar $5^a$, preferably formed integral with gear 5, and co-axial with shafts 2, 3 and 4, said collar $5^a$ being of suitable diameter.

Similarly, a gear 6 normally "floats" upon the reduced inner end $3^x$ of head $3^a$ of shaft 3, with a bushing $6^x$ interposed therebetween, said gear 6 having an annular internally serrated or toothed collar $6^a$ on its inner face, opposite to and of the same diameter as the aforesaid collar $5^a$.

Pivotally mounted upon the heads $2^a$ and $3^a$ intermediate the collars $5^a$, $6^a$ and $7^a$, are a plurality of cam fingers $2^d$, $3^d$, disposed longitudinally of the heads $2^a$, $3^a$, but evenly spaced circumferentially thereon (six such fingers on each head being shown). Fingers $2^d$, $3^d$, are preferably substantially Y-shaped as shown, and are each pivoted as at $2^z$, $3^z$, and adapted, when rocked on their pivots, to engage the heads $2^a$, $3^a$ either with the serrated or toothed annular collars $5^a$, $6^a$, or with the serrated or toothed annular collars $7^a$, and also, when in "neutral" position to be disengaged from collars $5^a$, $6^a$ and $7^a$, the outer ends of fingers $2^d$, $3^d$ being shaped to fit the serrations or teeth of the parts $5^a$, $6^a$, and $7^a$. The cam fingers $2^d$, $3^d$, however, may be of any desired shape or form. The upper edges $2^e$, $3^e$ of cam fingers $2^d$, $3^d$ are concaved for the purpose hereinafter described and set forth.

If desired, the fingers $2^d$, $3^d$, instead of being pivotally mounted on the heads $2^a$, $3^a$, might be slidably mounted thereon in suitable slots (not shown) disposed longitudinally of said heads, which slidable fingers may be moved simultaneously in said slots into engagement with the toothed collars $5^a$, $6^a$; or $7^a$.

The means for shifting the cam fingers $2^d$, $3^d$, into, or out of, engagement with the collars $5^a$, $6^a$ and $7^a$, preferably comprises ring members 8 and 9, which extend around the fingers $2^d$, $3^d$, and make a close fit thereon, which rings 8 and 9 are adapted to be moved longitudinally of the shafts 2, 3 and 4, upon the outer cam edges $2^e$, $3^e$ of said fingers, which outer edges of said fingers $2^d$, $3^d$ are concaved as above set forth, forming cam surfaces $2^e$, $3^e$, so that when the rings 8 and 9 are moved longitudinally of the heads $2^a$, $3^a$, rings 8 and 9 will act upon the cam surfaces $2^e$, $3^e$, to rock the fingers $2^d$, $3^d$ on their pivots into engagement either with the collars $5^a$, $6^a$, or with the collars $7^a$.

The peripheries of rings 8 and 9 are provided with circumferentially disposed grooves $8^a$, $9^a$, adapted to receive actuating bands 10 inset into said grooves. Extending into the casing 1 through opening $1^x$ at the top thereof is a lever 11, pivoted at $11^a$ to said casing.

A link $11^b$ connects ring 10 on ring 9 with the lever 11 below the pivot $11^a$, and a similar link $11^c$ connects ring 10 on ring 8 with the lever 11 above said pivot $11^a$, so that when the lever is shifted in one direction, the rings 8 and 9 will be moved away from each other, and when shifted in the opposite direction the rings 8 and 9 will be moved towards each other. Links $11^b$ and $11^c$ are of such length that when lever 11 is in vertical position the rings 8 and 9 will be directly in line with the pivots $2^z$, $3^z$ of the cam fingers.

Gears 5 meshes with a gear $12^a$ mounted on a shaft 12 journaled in suitable bearings in the casing 1 below and parallel with the shafts, 2, 3 and 4. At the other end of shaft 12 is a gear $12^b$ disposed directly below and in line with the gear 6. If desired, the gears $12^a$ and $12^b$ may be formed integrally on a sleeve $12^c$, as shown, and said sleeve $12^c$ may be mounted upon the shaft 12 with roller bearings $12^d$ interposed between the shaft 12 and said sleeve. Gear $12^a$ is in constant mesh with the floating gear 5, and gear $12^b$ is in constant mesh with floating gear 6 through an intermediate idler gear 13, which may be mounted upon a stud shaft $13^a$ mounted in suitable bearings in the casing in any desired manner, which gear 13 also meshes with the gear 6, whereby the gear 6 is caused to rotate in the same direction as the gear $12^b$, or sleeve $12^c$, while gears 5 and $12^a$, being intermeshing, rotate in opposite directions.

Obviously the relative sizes of gears 5, $12^a$, 6, $12^b$, and 13 may be varied, as desired, to suit any required conditions, and to obtain any desired ratio of speeds between the shafts 2 and 3.

*Operation.*

In operation, assuming that the shaft 2 is the driving shaft, and shaft 3 the driven shaft, when lever 11 is thrown to the left, (Fig. 1) the rings 8 and 9 will be moved simultaneously in opposite directions away from each other, and away from the member 7, and by reason of the concave cam surfaces $2^e$, $3^e$ of the fingers $2^d$, $3^d$ of the rings 8 and 9, will thereby rock the fingers $2^d$, $3^d$, on their pivots $2^z$, $3^z$, until the inner ends of said fingers engage the toothed or serrated members 7ᵃ of the member 7, and in this position of the rings 8 and 9, the fingers will be disengaged from the toothed or serrated collars 5ᵃ, 6ᵃ, of the gears 5 and 6. In this position of the lever 11, the driven shaft 3 will be directly connected to the driving shaft 2 through fingers 2ᵈ, 3ᵈ, and member 7, and shafts 2 and 3 will rotate together at the same speed, and in the same direction of rotation. Since the gears 5 and 6 are loosely mounted on the heads 2ᵃ, 3ᵃ, the said gears will "float" upon said heads and will not affect the rotation of said shafts 2 and 3.

If it is desired to disconnect the shaft 3 from the shaft 2, by throwing lever 11 into vertical position, as shown in Fig. 1, the rings 8 and 9 will be drawn together into their "neutral" positions at the centers of the cam surfaces 2ᵉ, 3ᵉ, and directly above the pivots 2ᶻ, 3ᶻ of the said fingers 2ᵈ, 3ᵈ. In this position the fingers 2ᵈ, 3ᵈ are disengaged from the collars 5ᵃ, 6ᵃ, and 7ᵃ, and no rotation will be imparted from shaft 2 to shaft 3, and shaft 2 may continue to rotate without rotating the shaft 3, and vice versa.

If it is desired to rotate the shafts 2 and 3 in opposite directions, by throwing lever 11 to the right, the rings 8 and 9 will be moved simultaneously towards each other and towards the members 7 and will rock the fingers 2ᵈ, 3ᵈ on their pivots until the outer ends of said fingers engage the toothed or serrated collars 5ᵃ, 6ᵃ respectively, said fingers being disengaged from the parts 7ᵃ of members 7. In this position the normally "floating" gears 5 and 6 will be locked by said fingers to the heads 2ᵃ, 3ᵃ of shafts 2 and 3, and will be caused to rotate therewith. Assuming that shaft 2 is the driving shaft, gear 5 will drive the gear 12ᵃ, causing sleeve 12ᶜ to rotate in the opposite direction from the shaft 2, and gear 12ᵇ, integral with gear 12ᵃ, will drive gear 6 through the idler gear 13 in the same direction of rotation as the sleeve 12ᶜ, hence driving shaft 3 in the opposite direction to shaft 2, and at a speed depending upon the ratios of gears 6 and 12ᵇ to gears 5 and 12ᵃ.

It is obvious that by varying the sizes of the gears 5, 12ᵃ, 6 and 12ᵇ and desired ratio of speeds between the shafts 2 and 3 may be readily obtained to suit any desired purpose.

My novel reversing mechanism is simple in construction and operation, and since the gears 5, 12ᵃ, 12ᵇ, 13, and 6 are constantly in mesh, there is no sliding or rolling of gears into mesh to obtain the desired speed changes, as is necessary in the usual types of mechanisms heretofore in use. Hence no great dexterity need be exercised in manipulating said mechanism. Furthermore, in changing from "direct" to "reverse" driving conditions, it is necessary to pass through the "neutral" position.

I do not limit my invention to the exact form shown in the drawings, for obviously changes could be made therein without departing from the scope of the invention.

I claim:

1. In mechanism of the character specified, a pair of aligned shafts, a member rotatably mounted coaxially of said shafts, and a finger movably mounted on each of said shafts adjacent the ends thereof and adapted to engage said member to lock the shafts together.

2. In mechanism as set forth in claim 1; means for simultaneously moving said fingers into or out of engagement with said member.

3. In mechanism of the character specified, a pair of aligned shafts, a member rotatably mounted coaxially of said shafts, a plurality of fingers movably mounted adjacent the ends of each said shaft, and adapted to engage said member to lock said shafts together.

4. In mechanism as set forth in claim 3; means for simultaneously moving said fingers into or out of engagement with said member.

5. In mechanism of the character specified, a pair of aligned shafts, a member rotatably mounted coaxially of said shafts, a plurality of fingers pivotally mounted on said shafts adjacent the ends thereof, and adapted to engage said member to lock said shafts together.

6. In mechanism as set forth in claim 5; means for simultaneously pivoting said fingers into or out of engagement with said member.

7. In mechanism of the character specified, a pair of aligned shafts, a member rotatably mounted intermediate said shafts and co-axially thereof, a plurality of fingers pivotally mounted on each of said shafts adjacent the ends thereof, said fingers being disposed longitudinally of said shafts, and arranged circumferentially thereof, and adapted to engage said member to lock said shafts together.

8. In mechanism as set forth in claim 7; means for simultaneously pivoting said fingers into or out of engagement with said member.

9. A reversing mechanism comprising a pair of aligned shafts; a member rotatably mounted coaxially of said shafts; gears normally floating upon each of said shafts; constantly meshed gearing connecting said gears and adapted to normally rotate said gears in opposite directions; and means for locking said shafts to said member or for locking said shafts to said gears.

10. In mechanism as set forth in claim 9; said means comprising a finger movably mounted upon each of said shafts intermediate the gears and rotatable member, each finger being adapted to engage said member when shifted in one direction and to engage its related gear when shifted in the opposite direction.

11. A reversing mechanism comprising a pair of aligned shafts; a member rotatably mounted intermediate and coaxially of said shafts; gears normally floating upon each of said shafts; a train of constantly meshed gearing meshing with said gears and adapted to normally rotate said gears in opposite directions; and means for locking said shafts to said rotatable member or for locking said shafts to said gears.

12. In mechanism as set forth in claim 11, said means comprising, a plurality of fingers pivotally mounted upon each said shaft intermediate the gears and rotatable member, said fingers being disposed longitudinally of said shafts, and arranged circumferentially thereof, and adapted to engage said rotatable member when rocked in one direction and to engage their related gears when rocked in the opposite direction, and means for simultaneously rocking all of said fingers.

13. A reversing mechanism comprising a pair of aligned shafts, a member rotatably mounted coaxially of said shafts, gears normally floating upon each of said shafts; a train of constantly meshed gearing meshing with said gears and adapted to cause said gears to rotate in opposite direction; a finger movably mounted upon each said shaft intermediate its gear and the rotatable member, each finger being adapted to engage said rotatable member when shifted in one direction, and to engage its related gear when shifted in the opposite direction, and means for simultaneously shifting said fingers.

14. In mechanism as set forth in claim 13, said means comprising a pivoted lever, a link connecting one of said fingers with said lever below its pivot, a link connecting the other said finger with the lever above its pivot, whereby said fingers will be moved simultaneously and in opposite directions as the lever is shifted.

15. A reversing mechanism comprising a pair of axially aligned shafts; a member rotatably mounted intermediate and coaxially of said shafts; gears normally floating upon each of said shafts, a train of constantly meshed gearing meshing with said gears and adapted to cause said shafts to rotate in opposite direction; a plurality of fingers pivotally mounted upon each said shaft intermediate the gears and the rotatable member, said fingers being disposed longitudinally of said shaft and arranged circumferentially thereof, and adapted to engage said rotatable member when pivoted in one direction, and to engage its related gear when pivoted in the opposite direction; and means for simultaneously pivoting said fingers.

16. In mechanism as set forth in claim 15, said means comprising a ring slidably engaging said fingers of each shaft; a pivoted lever; a link connecting one of said rings with said lever below its pivot, a link connecting the other said ring with the lever above its pivot, whereby said rings will be moved simultaneously in opposite directions as the lever is shifted to rock said fingers on their pivots.

17. In mechanism of the character specified, a casing; a pair of aligned shafts entering said casing, the adjacent ends of said shafts being provided with enlarged cylindrical heads having axial bores therein; an idler shaft journaled in said bores; a member mounted upon said idler shaft intermediate said heads, said member being provided with serrated portions on each face thereof coaxial with said shafts; a plurality of evenly spaced movable fingers mounted longitudinally on each of said heads and disposed circumferentially thereof, and adapted to be shifted to engage the serrated portions of said member to lock said heads together.

18. In combination with mechanism as set forth in claim 17, gears floating upon each of said heads, said gears being provided with serrated portions opposite to said fingers; a train of constantly meshing gearing meshing with said gears and adapted to cause said gears to rotate in opposite directions; and means for simultaneously shifting said fingers in one direction to engage the serrated portions of said member to lock said heads together, and for simultaneously shifting said fingers in the opposite direction to engage the serrated portions of said gears to lock said gears to said heads.

19. A reversing mechanism comprising a casing; a pair of axially aligned shafts entering said casing, the adjacent ends of said shafts being provided with enlarged cylindrical heads having axial bores therein; an idler shaft journaled in said bores; a member mounted upon said idler shaft intermediate said heads, said member being provided with serrated portions on each face thereof coaxial with said shafts; a plurality of evenly spaced movable fingers mounted longitudinally on said heads and disposed circumferentially thereof; a gear normally floating upon each said head, and provided with serrated portions opposite said fingers; a train of constantly meshing gearing meshing with said gears and adapted to rotate said gears in opposite directions; and means for simultaneously shifting said fingers in one direction to engage the serrated portions of said member to lock said heads together, and for simultaneously shifting said fingers in the opposite direction to engage the serrated portions of said gears to lock said gears to said heads.

20. In combination with mechanism as set forth in claim 19, said means comprising a ring engaging the fingers on each head; a lever entering said casing and pivoted thereon; a link connecting one ring to said lever below its pivot; a link connecting the other ring with the lever above its pivot, whereby as the lever is shifted said rings are simultaneously moved longitudinally of said heads in opposite directions.

21. In mechanism of the character specified, a casing; a pair of aligned shafts entering said casing, the adjacent ends of said shafts being provided with enlarged cylindrical heads having axial bores therein; an idler shaft journaled in said bores; a member mounted upon said idler shaft intermediate said heads, said member being provided with serrated portions on each face thereof coaxial with said shafts; a plurality of evenly spaced pivoted fingers mounted longitudinally on said heads and disposed circumferentially thereof, gears normally floating upon each of said heads, said gears being provided with serrated portions opposite said fingers; a train of constantly meshing gearing connecting said gears and adapted to rotate same in opposite directions; and means for simultaneously pivoting said fingers in one direction to engage the serrated portions of said member to lock said heads together; or for pivoting said fingers in the opposite direction to engage the serrated portion of said gears to lock said gears to said heads.

22. In combination with mechanism as set forth in claim 18, said means comprising rings surrounding said fingers on each head; a lever entering said casing and pivoted thereon; a link connecting one ring to said lever below its pivot; a link connecting the other ring with the lever above its pivot, whereby as the lever is shifted said rings are simultaneously moved longitudinally of said heads in opposite directions.

23. A reversing mechanism comprising a casing; a pair of axially aligned shafts entering said casing, the adjacent ends of said shafts being provided with enlarged cylindrical heads having axial bores; an idler shaft journaled in said bores; a member mounted upon said idler shaft intermediate said heads, said member being provided with serrated portions on each face thereof coaxial with said shafts; a plurality of evenly spaced pivoted fingers mounted longitudinally on said heads and disposed circumferentially thereof, and adapted to be pivoted to engage the serrated portions of said member; gears normally floating upon each of said heads, said gears being provided with serrated portions opposite said fingers; a counter shaft; a pinion on said countershaft meshing with one of said gears; a second pinion on said countershaft opposite the other said gear; an idler gear meshing with said second pinion and said other gear; and means for simultaneously pivoting said fingers in one direction to engage the serrated portions of said member to lock said heads together, or for pivoting said fingers in the opposite direction to engage the serrated portions of said gears to lock said gears to said heads.

24. In combination with mechanism as set forth in claim 23, said means comprising rings surrounding the fingers on each head; adapted to slide on the outer edges thereof; a lever entering said casing and pivoted thereon; a link connecting one ring to said lever below its pivot; a link connecting the other ring with the lever above its pivot, whereby as the lever is shifted said rings are simultaneously moved longitudinally of said heads in opposite directions to cause said fingers to turn on their pivots.

In testimony that I claim the foregoing as my own, I affix my signature.

HENRY LOWE BROWNBACK.